United States Patent
Lin

(10) Patent No.: US 7,534,063 B2
(45) Date of Patent: May 19, 2009

(54) GLUE DISPENSER FOR LENS MODULE ASSEMBLING

(75) Inventor: Mong-Tung Lin, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 113 days.

(21) Appl. No.: 11/644,367

(22) Filed: Dec. 21, 2006

(65) Prior Publication Data
US 2007/0215291 A1 Sep. 20, 2007

(30) Foreign Application Priority Data
Mar. 17, 2006 (CN) .................... 2006 1 0034542

(51) Int. Cl.
*B43M 11/06* (2006.01)
*A46B 15/00* (2006.01)
(52) U.S. Cl. .................... 401/265; 401/9; 401/193; 222/330
(58) Field of Classification Search .................... 401/9, 401/28, 193, 263, 265; 222/330; 118/313; 427/2.24, 162
See application file for complete search history.

(56) References Cited
U.S. PATENT DOCUMENTS
2,335,623 A * 11/1943 Utterback .................... 15/219

* cited by examiner

*Primary Examiner*—David J Walczak
(74) *Attorney, Agent, or Firm*—Steven M. Reiss

(57) ABSTRACT

A glue dispenser (40), for dispensing adhesive in assembling a lens module, includes a dispensing portion (41). The dispensing portion has a top side (411), a bottom side (412) positioned opposite to the top side, and a sidewall (413) connected to the top side and the bottom side. The dispensing portion further includes a main flow passage (415) for transporting adhesive therethrough and a plurality of feed flow passages (416). The main flow passage runs perpendicular from the top side toward the bottom side of the dispensing portion. The feed flow passages communicate with the main flow passage and radially extend to a joint of the side wall and the bottom side. At such a joint, the respective feed flow passages terminate and form a plurality of output ports (417) along an outer circumference of the bottom side.

10 Claims, 4 Drawing Sheets

GLUE DISPENSER FOR LENS MODULE ASSEMBLING

CROSS-REFERENCE TO RELATED APPLICATIONS

This application is related to a co-pending U.S. patent application Ser. No. 11/644,255, entitled "SPACER AND LENS MODULE USING SAME AND METHOD OF ASSEMBLING LENS MODULES", by Mong-Tung Lin. Such application has the same assignee as the present application and has been concurrently filed herewith. The above-identified application is incorporated herein by reference.

TECHNICAL FIELD

The present invention generally relates to glue dispensers and, more particularly, to a glue dispenser for lens module assembling.

BACKGROUND

Portable communication devices, such as mobile phones, personal digital assistants (PDAs) and/or palm-top computers containing digital cameras have become some of the most popular commodities in modern electronics. A typical lens module includes a barrel having a stopper ring therein, a first lens, a spacer and a second lens. In assembly, the first lens and the spacer are sequentially placed in the barrel, and the first lens is sandwiched between the stopper ring and the spacer. Then, an adhesive/glue is applied to the spacer adjacent to an inner circumference of the barrel by employing a syringe with a needle dispensing section. After the gluing process, the second lens is mounted in the barrel and attached to the spacer and the inner circumference of the barrel via the adhesive, so as to fix the first lens and the spacer in the barrel.

However, in the gluing process, the syringe has to rotate relative to the lens module to dispense an adhesive circle or a plurality of adhesive dots to the spacer. Therefore, the gluing process is time consuming. In addition, it is difficult to precisely control the adhesive amount and distribution, which can seriously affect the quality of the lens module.

Therefore, an improved glue dispenser for lens module assembly is desired in order to overcome the above-described shortcomings.

SUMMARY

In one aspect, a glue dispenser for lens module assembling is provided. The glue dispenser includes a dispensing portion. The dispensing portion has a top side, a bottom side positioned on an opposite side to the top side, and a sidewall connected to the top side and the bottom side. The dispensing portion further includes a main flow passage configured for containing adhesive therein; and a plurality of feed flow passages. The main flow passage runs/extends perpendicular from the top side to the bottom side of the dispensing portion. The feed flow passages communicate with the main flow passage and extend to a joint of the side wall and the bottom wall, thus forming a plurality of output ports along an outer circumference of the bottom side.

Other advantages and novel features will become more apparent from the following detailed description when taken in conjunction with the accompanying drawings.

BRIEF DESCRIPTION OF THE DRAWINGS

Many aspects of the present glue dispenser for lens module assembling can be better understood with reference to the following drawings. The components in the drawings are not necessarily drawn to scale, the emphasis instead being placed upon clearly illustrating the principles of the glue dispenser. Moreover, in the drawings like reference numerals designate corresponding parts throughout the several views.

DETAILED DESCRIPTION OF THE PREFERRED EMBODIMENT

Figure 1:
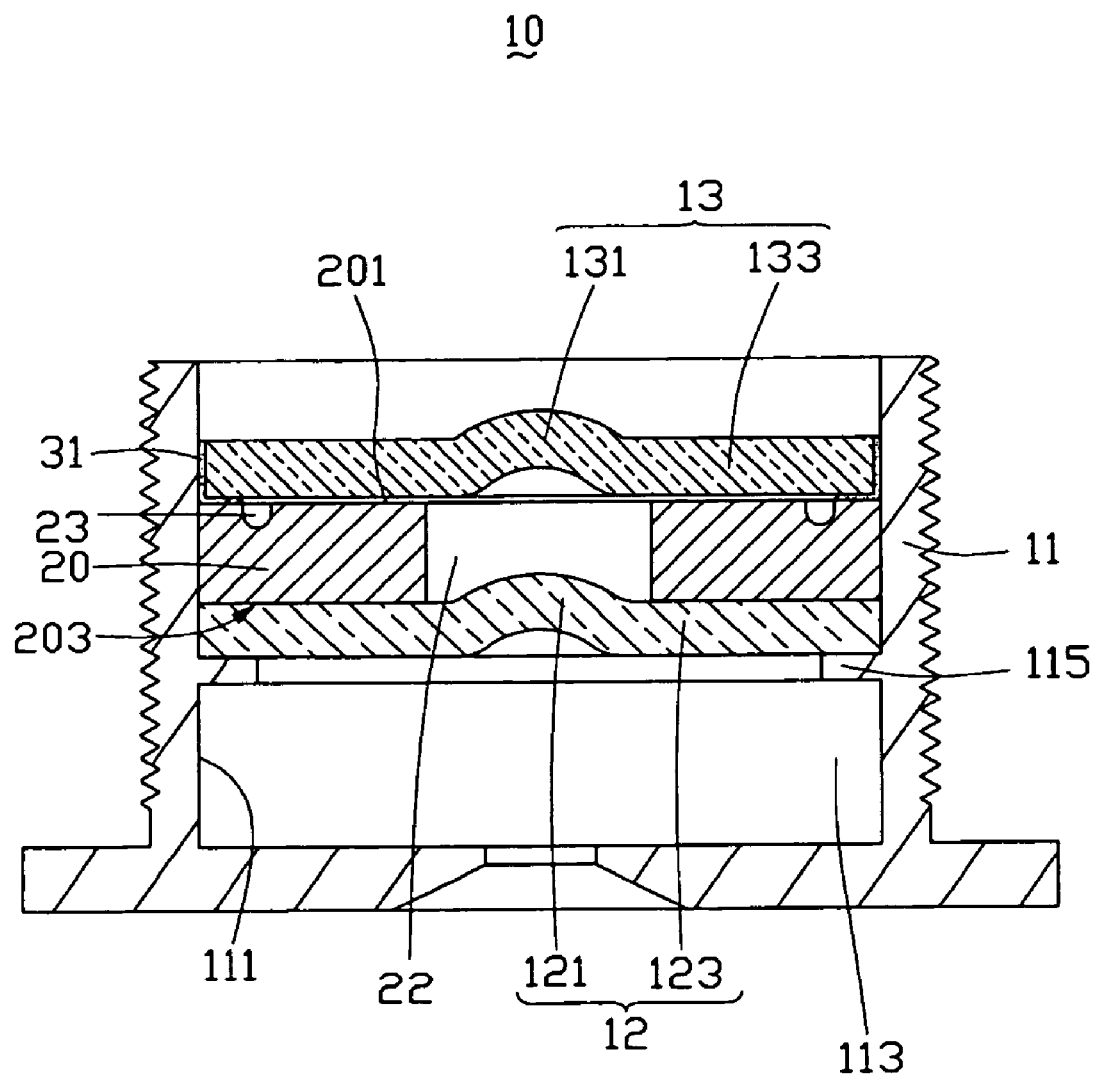
FIG. 1 is a schematic, cross-sectional view of a lens module, according to a preferred embodiment.
Figure 2:
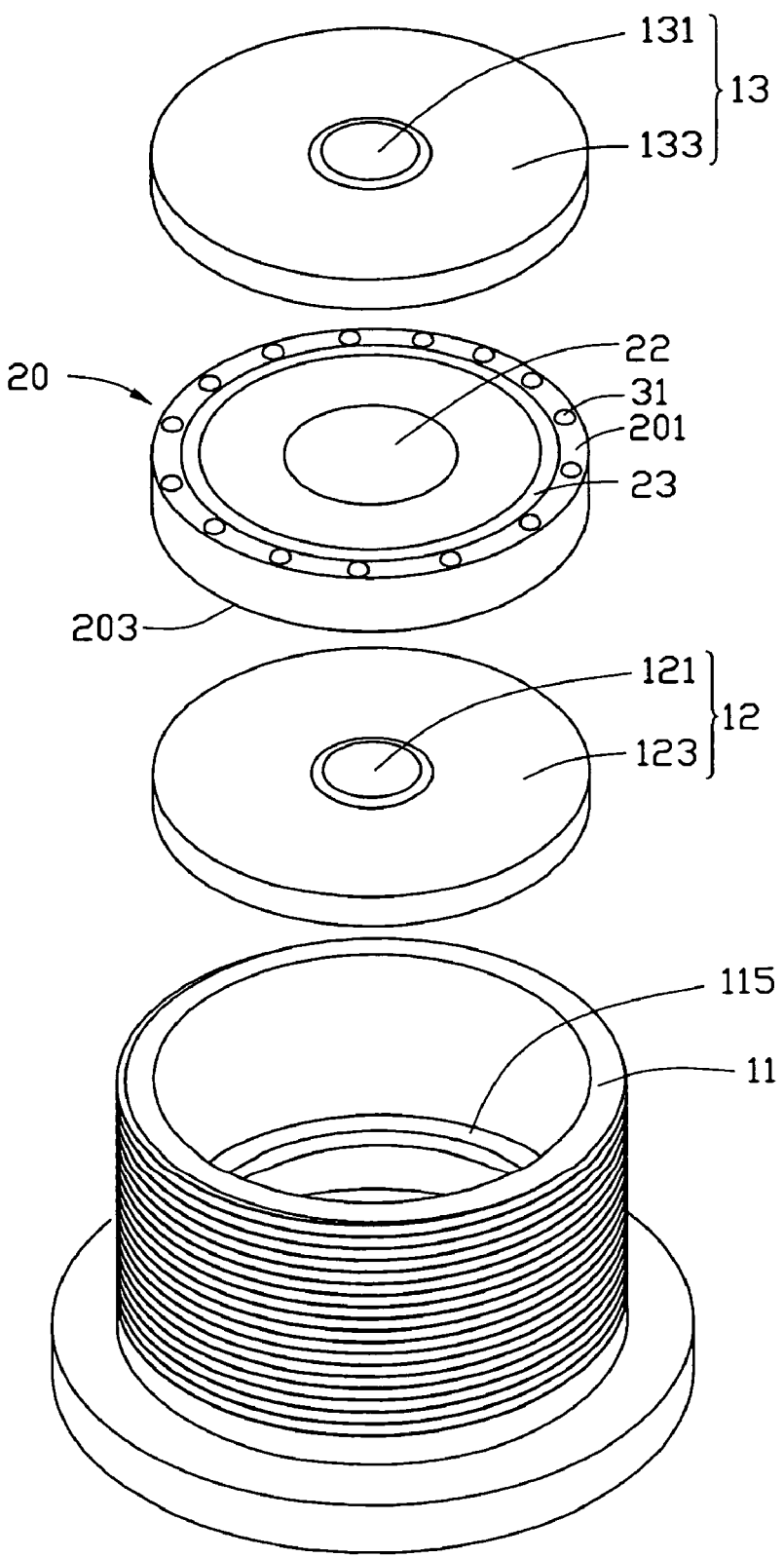
FIG. 2 is an exploded, perspective view of FIG. 1.

As illustrated in FIGS. 1 and 2, a lens module 10, according to a preferred embodiment, includes a barrel 11, a first lens 12, a second lens 13, a spacer 20, and a plurality of adhesive/glue dots 31.

The barrel 11 is cylindrical and includes an inner circumferential wall 111 and a cylindrical receiving cavity 113. The receiving cavity 113 is surrounded by the inner circumferential wall 111 and is configured (i.e., structured and arranged) to receive optical elements, such as the first and second lenses 12, 13 and the spacer 20, therein. The barrel 11 further provides a stopper ring 115, which extends annularly and inwardly from the inner circumferential wall 111 (i.e., wall 111 defining a cylinder) of the barrel 11, to position and support the optical elements in the receiving cavity 113. The stopper ring 115 has a supporting surface (not labeled), which is flat and perpendicular to an axis of the barrel 11. The supporting surface of the stopper ring 115 is used to contact with and support the first lens 12.

The first and second lenses 12, 13 are configured to cooperatively form an image of an object. The first lens 12 essentially includes an optical portion 121 and a base portion 123. The optical portion 121 is formed in a middle portion of the base portion 123 and has a predetermined spherical or aspherical surface to participate in forming the object image. The base portion 123 is adapted for fixing the first lens 12 into the barrel 11. The first lens 12 has a diameter approximately equal to a diameter of the receiving cavity 113 of the barrel 11. Thus, when the first lens 12 is received in the barrel 11, an outer periphery of the first lens 12 can abut against the inner circumferential wall 111 of the barrel 11 to prevent radial movements of the first lens 12. The second lens 13 has a similar structure to the first lens 12 and includes an optical portion 131 and a base portion 133.

The spacer 20 is an annular cylinder and has an outer diameter slightly less than the diameter of the receiving cavity 113 of the barrel 11. The spacer 20 has an upper surface 201, a lower surface 203 positioned opposite to the upper surface 201, a through hole 22 extending through a body of the spacer 20 and penetrating the upper surface 201 and the lower surface 203, and an annular slot 23 defined in the upper surface 201. The spacer 20 has an axial length/distance between the upper surface 201 and the lower surface 203, which is chosen according to a desired focal length. The through hole 22 of the spacer 20 has a diameter larger than the diameters of the optical portions 121, 131 of the first and second lenses 12, 13, thus permitting light to pass therethrough. The slot 23 is defined between an outer circumference of the spacer 20 and an inner circumference of the spacer 20.

The adhesive/glue dots 31 consist of a hardenable adhesive/glue, such as an ultraviolet glue (UV glue) or a thermosetting glue. The adhesive/glue dots 31 are applied to the upper surface 201 of the spacer 20, along the outer circumference of the upper surface 201, and outside the slot 23. The adhesive/glue dots 31 are dispensed in precisely measured amounts and are equally spaced.

The first lens 12, the spacer 20 and the second lens 13 are sequentially placed in the receiving cavity 113 of the barrel 11, and the outer peripheries of the first lens 12, the spacer 20 and the second lens 13 abut/bias against the inner circumferential wall 111 of the barrel 11 so as to restrain radial movements thereof. The base portion 123 of the first lens 12 abuts against the supporting surface of the stopper ring 115. The spacer 20 is sandwiched between the first lens 12 and the second lens 13, wherein the lower surface 203 of the spacer 20 abuts against the base portion 123, the upper surface 201 of the spacer 20 abuts against the base portion 133 of the second lens 13, and the through hole 22 is aligned with the optical portions 121, 131. The second lens 13 is fixed to the spacer 20 and the inner circumferential wall 111 of the barrel 11, via the adhesive/glue dots 31. Hence, the second lens 13 and the stopper ring 115 cooperatively secure the first lens 12 and the spacer 20 in the barrel 11.

Figure 3:
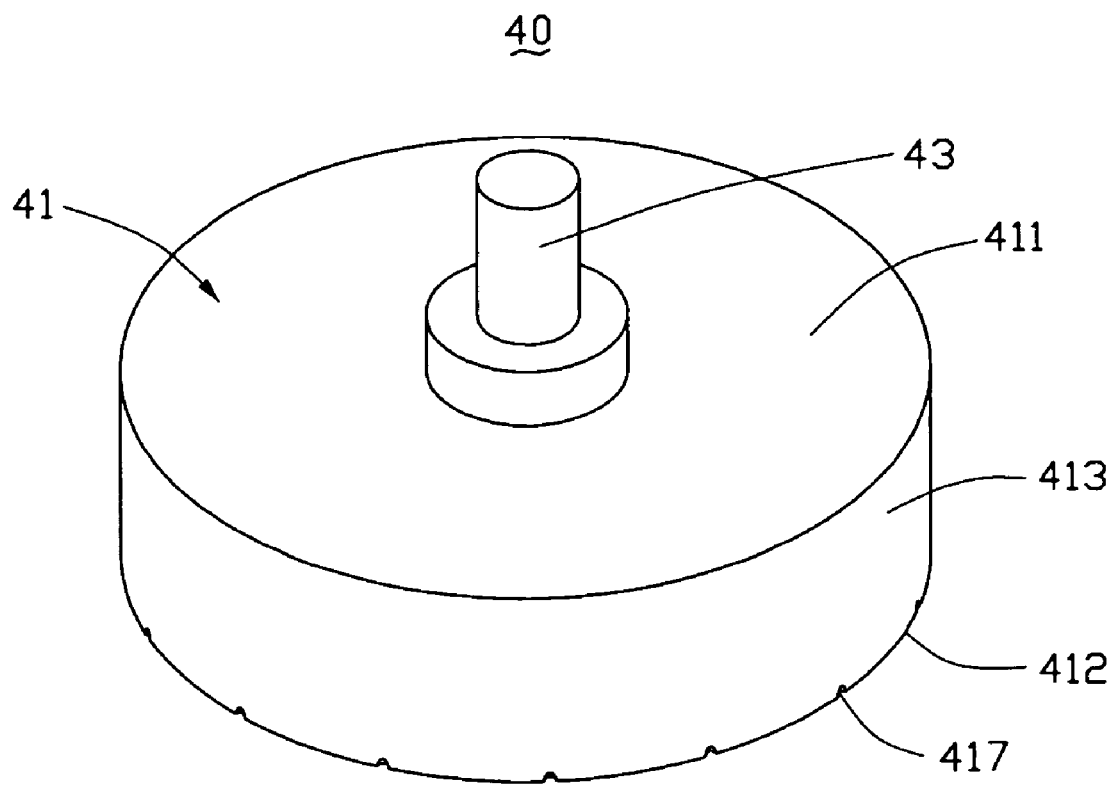
FIG. 3 is a schematic, perspective view of a glue dispenser, according to another preferred embodiment.
Figure 4:
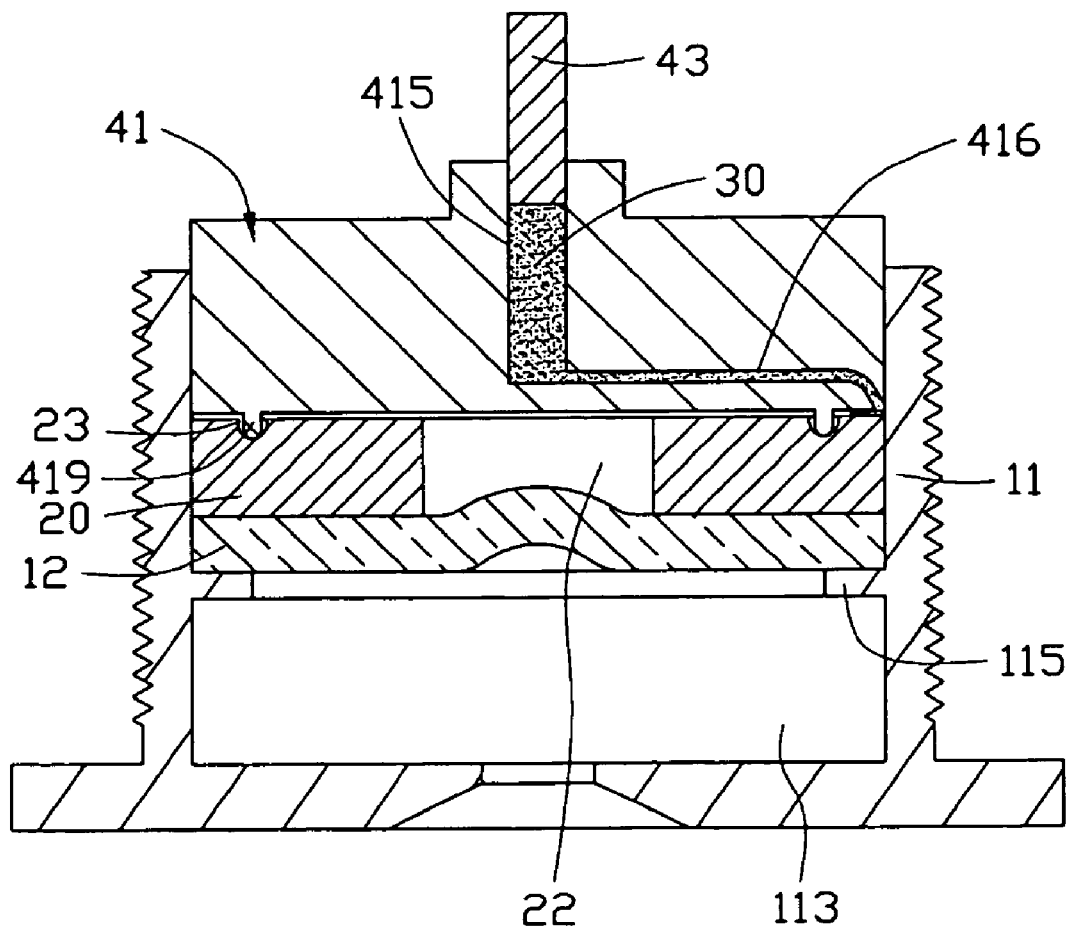
FIG. 4 is a schematic, cross-sectional view of the glue dispenser of FIG. 3, in a state of dispensing adhesive to the lens module.

Referring to FIGS. 3 and 4, a glue dispenser 40 configured for dispensing glue/adhesive dots 31 to the spacer 20, according to a preferred embodiment, is shown. The dispenser 40 mainly includes a dispensing portion 41 and a piston portion 43. The dispensing portion 41 is advantageously cylindrical to allow it to matingly match with the receiving cavity 113 of the barrel 11. More specifically, the dispensing portion 41 preferably has a diameter approximately equal to the diameter of the receiving cavity 113 of the barrel 11 to facilitate a sliding clearance fit therebetween. The dispensing portion 41 includes a top side 411, a bottom side 412, and a cylindrical sidewall 413. The bottom side 412 of the dispensing portion 41 is positioned opposite to the top side 411. The dispensing portion 41 also has a main flow passage 415 and a plurality of feed flow passages 416. The main flow passage 415 and the respective feed flow passages 416 are cooperatively used to transport flowable and hardenable adhesive/glue 30 to a plurality of chosen gluing locations (i.e., the positions of the adhesive/glue dots 31). The main flow passage 415 is defined generally centrally/axially inside the dispensing portion 41. The main flow passage 415, usefully, runs/extends perpendicular from the top side 411 toward the bottom side 412 but does not penetrate the bottom side 412 (i.e., glue is not permitted to reach the bottom side 412 in a central area of the lens module 10). The feed flow passages 416 communicate with a lower portion of the main flow passage 415 and radiate outwardly therefrom. The feed flow passages 416 respectively extend to a joint of the sidewall 413 and the bottom side 412 of the dispensing portion 41. At such a joint, the respective feed flow passages 416 terminate and, thus, form a plurality of output ports 417. Such output ports 417 communicate with ambient air to permit dispensing of adhesive/glue therefrom. Each output port 421 is, advantageously, equally spaced from each adjacent port 417 (i.e., ports 417 are evenly and regularly spaced). The bottom side 412 of the dispensing portion 41 has on annular ring 419 projecting therefrom. The annular ring 419 has a configuration similar to the annular slot 23 of the spacer 20 for mating with the annular slot 23. The piston portion 43 is axially movably placed in and fluidly seals the main flow passage 415. The piston portion 43 can be manually controlled by an operator or automatically controlled by a computer. The piston portion 43 should, preferably, be controlled by a computer. As such, the dispenser 40 would be able to precisely dispense a plurality of adhesive/glue dots 31, with each dot 31 having a predetermined amount of glue associated therewith.

method of assembling the lens module 10 includes the following steps:

(1) providing a barrel 11 having an inner circumferential wall 11 and a stopper ring 115;

(2) placing a first lens 12 into the barrel 11 until the first lens 12 abuts on the stopper ring 115, the first lens 12 including an optical portion 121 and a base portion 123 contacting with the stopper ring 115;

(3) mounting a spacer 20 directly upon the first lens 12, the spacer 20 (i.e., the spacer body) having a through hole 22, a lower surface 203, and an upper surface 201, the through hole 22 aligning with the optical portion 121 of the first lens 12, the lower surface 203 contacting the first lens 12, and the upper surface 201 having an annular slot 23 defined therein;

(4) placing a glue dispenser 40 into the barrel 11, the glue dispenser 40 having a cylindrical dispensing portion 41 including a bottom side 412, a plurality of output ports 417, and an annular ring 419, the glue dispenser 40 being positioned with the bottom side 412 contacting the upper surface 201 of the spacer 20, the annular ring 419 engaging the annular slot 23 of the spacer 20, and the output ports 417 corresponding to an interface between the spacer 20 and the inner circumferential wall 111 of the barrel 11;

(5) employing the glue dispenser 40 to synchronously dispense a plurality of adhesive/glue dots 31 on the upper surface 201 of the spacer 20 along an outer circumference thereof, the adhesive/glue dots 31 being precisely dispensed in amount and equally spaced from an adjacent adhesive/glue dot 31; and (6) mounting a second lens 13 onto the upper surface 201 of the spacer 20 for attaching the second lens 13 to the upper surface 201 of the spacer 20 and the inner circumferential wall 111 of the barrel 11, via the adhesive/glue dots 31.

To improve the optical performance of the lens module 10 repeat steps (2) to (6) to mount more optical members, such as lenses or filters, into the barrel 11.

It is to be understood that the adhesive/glue dispensed on the spacer 20 should preferably be a plurality of adhesive/glue dots 31, the adhesive/glue also can be a plurality of adhesive/glue strips extending along the outer circumference of the upper surface 201 of the spacer 20. Correspondingly, the output ports 417 of the dispenser 40 can be circular openings shaped according to the adhesive/glue dots 31 or strip-shaped openings, in accordance with the adhesive/glue strips.

It is to be understood that the annular ring 419 of the dispenser 40 can be divided into several portion instead of the one-piece ring in the preferred embodiment.

In the foresaid exemplary embodiment, the spacer 20 has a slot 23 defined therein, the slot 23 is configured for receiving redundant adhesive/glue, and, thus, there is minimal risk of excess adhesive/glue, overflowing down the through hole 22 to pollute the lenses 12, 13. In addition, the adhesive/glue dots 31 are synchronously dispensed to the spacer 20, and the distribution of the adhesive/glue dots 31 is determined by the corresponding distribution of the output ports 417 of the dispenser 40. Therefore, the method of assembling the lens module 10 is much faster, and the distribution of the adhesive/glue dots 31 is relatively easy to control.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A glue dispenser configured for dispensing adhesive in a process of assembling a lens module, comprising:
    a dispensing portion having a top side, a bottom side positioned opposite to the top side, and a sidewall connecting to the top side and the bottom side, the dispensing portion including:
    a main flow passage configured for containing adhesive therein, and an annular ring projecting from the bottom side, the main flow passage running perpendicular from the top side toward the bottom side of the dispensing portion; and
    a plurality of feed flow passages communicating with the main flow passage, the feed flow passages radially extending to a joint of the sidewall and the bottom side to thus form a plurality of output ports along an outer circumference of the bottom side.

2. The glue dispenser as claimed in claim 1, wherein each respective output port is equally spaced from each adjacent output port.

3. The glue dispenser as claimed in claim 1, wherein the output ports are circular openings.

4. The glue dispenser as claimed in claim 1, wherein the output ports are stripe-shaped openings.

5. The glue dispenser as claimed in claim 1, wherein the dispenser further includes a piston portion movably engaged with and fluidly sealing the main flow passage.

6. The glue dispenser as claimed in claim 5, wherein the piston portion is axially movably placed in and fluidly seals the main flow passage.

7. The glue dispenser as claimed in claim 5, wherein the piston portion is manually controllable by an operator.

8. The glue dispenser as claimed in claim 5, wherein the piston portion is automatically controlled by a computer.

9. The glue dispenser as claimed in claim 1, wherein the main flow passage is defined generally centrally/axially inside the dispensing portion.

10. The glue dispenser as claimed in claim 1, wherein the feed flow passages communicate with a lower portion of the main flow passage and radiate outwardly therefrom.

* * * * *